United States Patent [19]

Brooks

[11] Patent Number: 4,889,465
[45] Date of Patent: Dec. 26, 1989

[54] SELF-LOADING SAILBOAT TRAILER

[76] Inventor: Richard E. Brooks, Rte. 1, Box 263, Chassell, Mich. 49916

[21] Appl. No.: 212,294

[22] Filed: Jun. 27, 1987

[51] Int. Cl.⁴ .......................... B63C 13/00; B60P 1/48; B60P 3/10; B66C 13/02
[52] U.S. Cl. .................................. 414/546; 280/406.1; 414/678
[58] Field of Search .................. 414/546–548, 414/555, 560, 542, 506, 678, 540; 280/406 R, 482, 414.1, 406.1; 212/180, 182, 187, 189, 238, 262

[56] References Cited

U.S. PATENT DOCUMENTS

| | | | |
|---|---|---|---|
| 582,908 | 5/1897 | Feidt | 254/359 |
| 602,611 | 4/1898 | Agnew | 114/373 |
| 1,195,461 | 8/1916 | Greene | 212/195 |
| 1,494,580 | 5/1924 | Brandt | 212/262 X |
| 1,598,220 | 8/1926 | Palotce | 414/542 |
| 1,873,433 | 8/1932 | Larsen | 212/189 X |
| 2,492,172 | 12/1949 | Morris | 294/74 |
| 2,550,185 | 4/1951 | Busch | 414/546 X |
| 2,571,361 | 10/1951 | Harmanson | 414/546 |
| 2,776,761 | 1/1957 | Lovelace | 414/542 X |
| 2,859,049 | 11/1958 | Hyler et al. | 280/406 R |
| 2,941,678 | 6/1960 | Keys | 414/546 |
| 3,160,289 | 12/1964 | Leefer | 414/546 X |
| 3,215,404 | 11/1965 | Ryan | 280/406 R X |
| 3,276,610 | 10/1966 | Thatcher | 414/546 X |
| 3,460,696 | 8/1969 | Owen, Jr. | 414/560 X |
| 3,554,394 | 1/1971 | Hedman | 414/350 |
| 3,583,494 | 6/1971 | Thompson et al. | 280/406 R X |
| 3,602,544 | 8/1971 | Marsh | 294/74 |
| 3,682,335 | 8/1972 | Smyth | 414/506 |
| 3,701,443 | 10/1972 | Van Der Lely | 414/546 |
| 3,767,231 | 10/1973 | Grosse-Rhode | 280/482 |
| 3,794,192 | 2/1974 | Monson | 414/542 X |
| 4,269,561 | 5/1981 | Rutten | 414/546 X |
| 4,383,791 | 5/1983 | King | 414/546 X |
| 4,601,633 | 7/1986 | F'Geppert | 414/546 |

FOREIGN PATENT DOCUMENTS

| | | | |
|---|---|---|---|
| 735484 | 5/1943 | Fed. Rep. of Germany . | |
| 2364812 | 5/1978 | France | 414/678 |
| 2395185 | 2/1979 | France | 280/414.1 |
| 450182 | 4/1968 | Switzerland | 280/406 R |
| 130171 | 10/1978 | U.S.S.R. | 414/560 |
| 1088967 | 4/1984 | U.S.S.R. | 414/542 |
| 564589 | 10/1944 | United Kingdom | 212/180 |

OTHER PUBLICATIONS

EZ Loader advertisement for Boat Trailers, ©1985.

Primary Examiner—David Bucci
Attorney, Agent, or Firm—Price, Heneveld, Cooper, DeWitt & Litton

[57] ABSTRACT

A self-loading trailer which is operable to launch and load a fixed keel boat includes a frame for hauling and storing the boat, a pivotal boom for swinging the boat between the trailer and the water surface and a winch assembly for pivoting the boom during the launching and loading operations. Also, to increase the counterweight provided by a vehicle, the trailer is provided with an extensible tongue and a counterweight assembly.

29 Claims, 5 Drawing Sheets

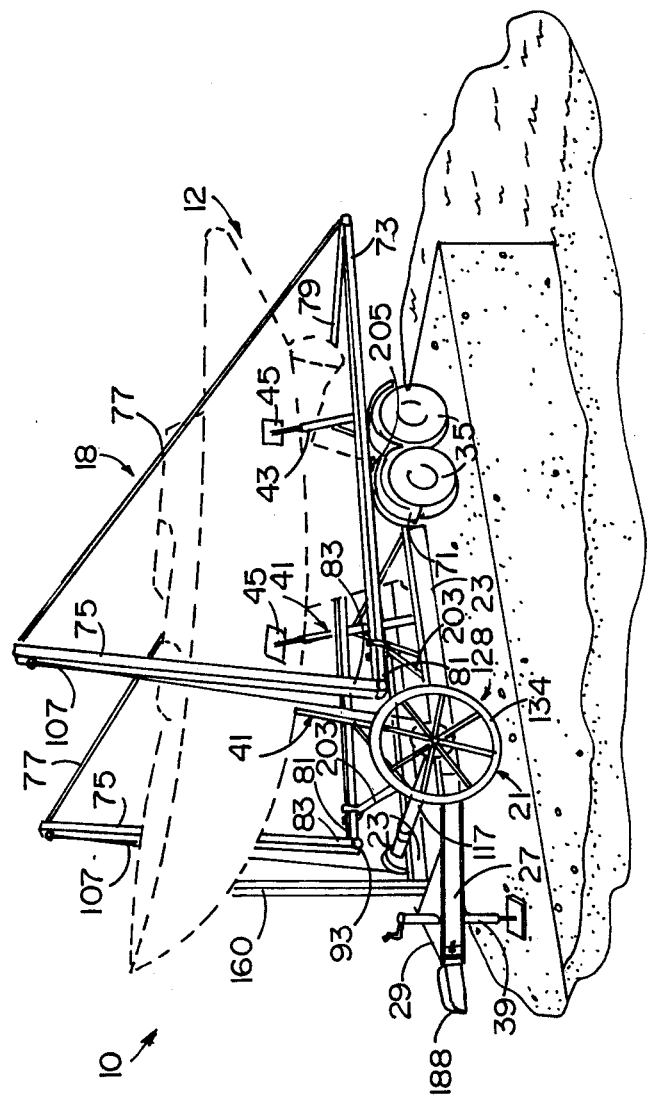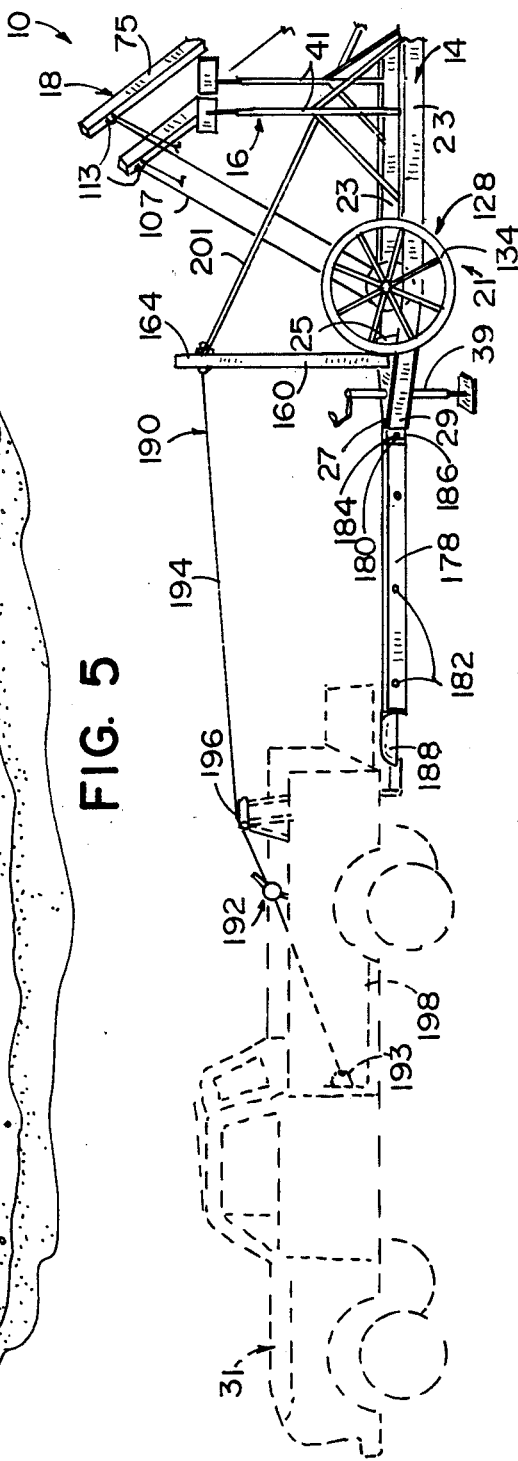

4,889,465

SELF-LOADING SAILBOAT TRAILER

BACKGROUND OF THE INVENTION

The present invention pertains to self-loading trailers and in particular to a trailer specially suited for fixed keel boats.

The loading (or conversely the launching) of a boat onto a trailer is a difficult task, particularly if the boat possesses a fixed keel. In these situations, the boat cannot normally be floated to a location near enough to a sloping shore to enable the trailer to be submerged beneath the boat for mounting and loading purposes. These boats are, therefore, typically loaded (or launched) with a commercial hoist which lifts the boat from the water and places it upon the trailer.

Although the use of these hoists adequately loads and launches fixed keel boats, their availability is limited. Generally, these hoists are large, permanently mounted devices located in marinas and at some public access points. However, numerous other locations possessing adequate draft clearance exist which are rendered inaccessible to the sailors of such boats only due to the lack of a hoist to load or launch the boat. Moreover, even if a hoist is available, long delays may be experienced waiting in lines for the few available hoists.

SUMMARY OF THE INVENTION

The trailer of the present invention includes a frame adapted and structured to support a relatively large fixed keel boat for storage and transport. A boom having a pivotally mounted arm structure positioned to each side of the boat is mounted to the frame of the trailer to effect the loading and launching of the boat. A winch assembly interacts between the frame and the boom to swing the boat freely between the trailer and the water surface.

By using the trailer of the present invention, the launching and loading of the boat may be easily effected at a wide range of locations previously rendered inaccessible due to the lack of a hoist. Also, long lines at commercial hoists may be circumvented to thereby decrease the total amount of time consumed launching and loading the boat.

These and other objects, advantages and features of the present invention will be more fully understood and appreciated by reference to the written specification and appended drawings.

BRIEF DESCRIPTION OF THE DRAWINGS

FIG. 4 is a side view of the trailer coupled to a vehicle;

FIG. 5 is a perspective view of the trailer, and a boat, in a traveling position;

DETAILED DESCRIPTION OF THE PREFERRED EMBODIMENTS

Figure 1:
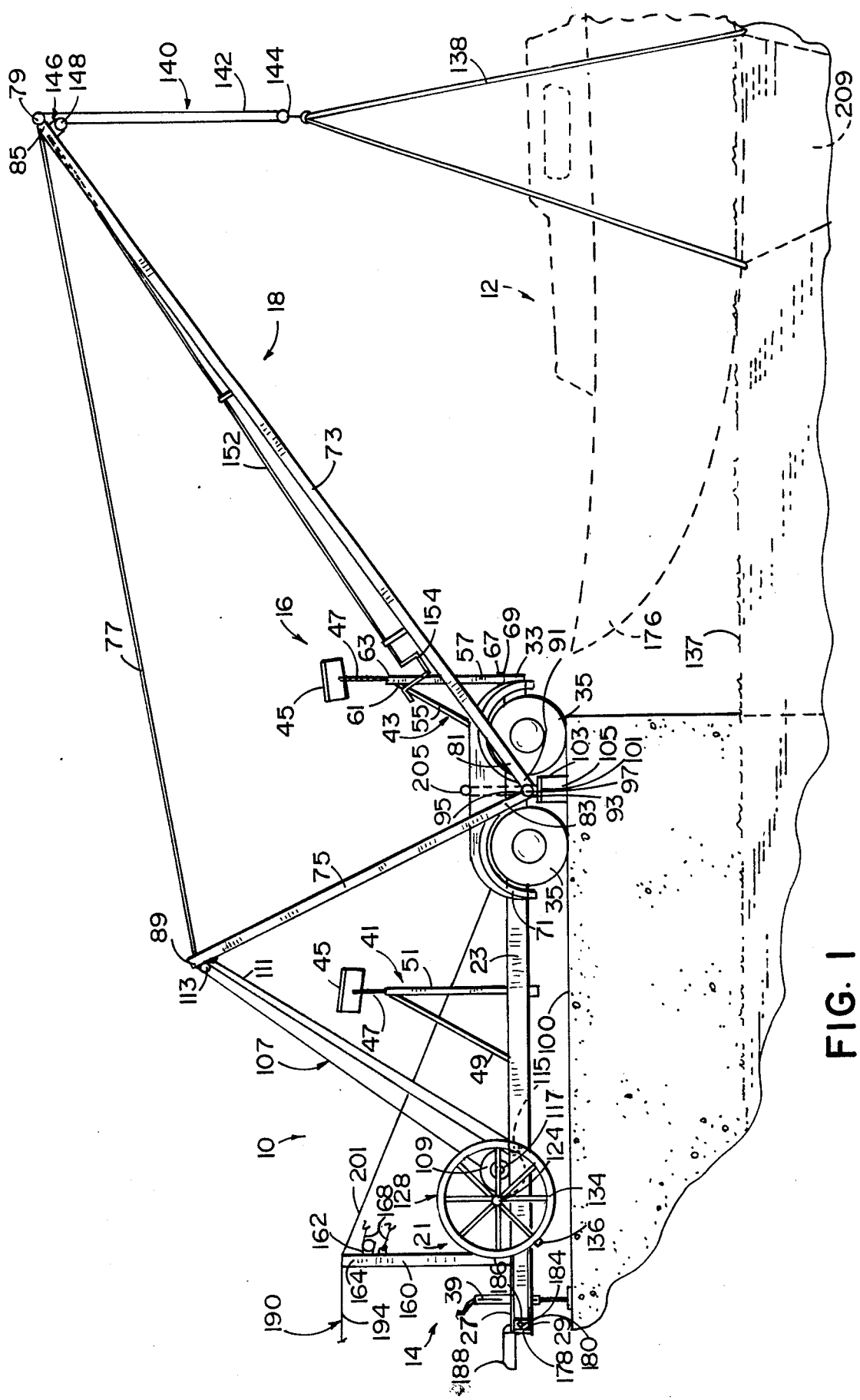
FIG. 1 is a side elevational view of a trailer of the present invention prepared to lift a boat from the water for loading purposes.
Figure 2:
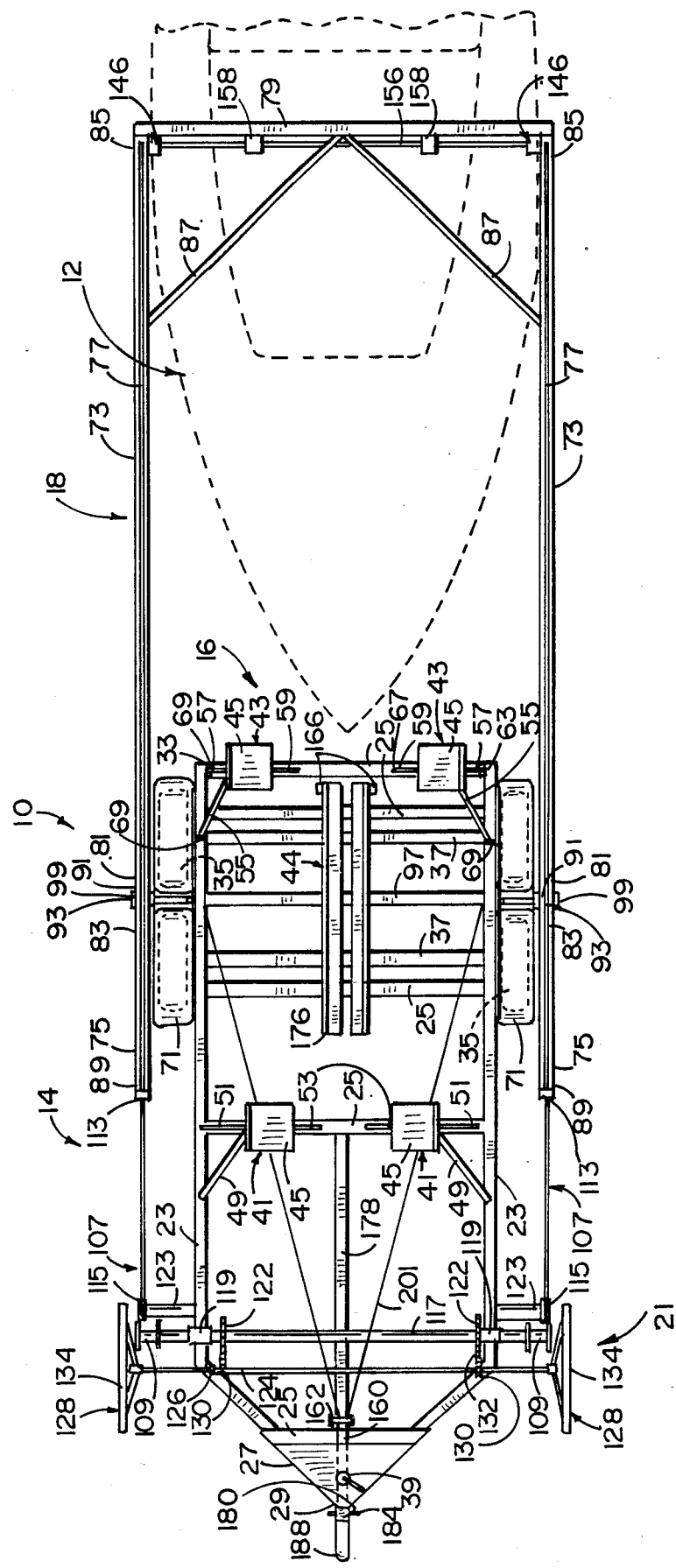
FIG. 2 is a top plan view of the trailer.
Figure 3:
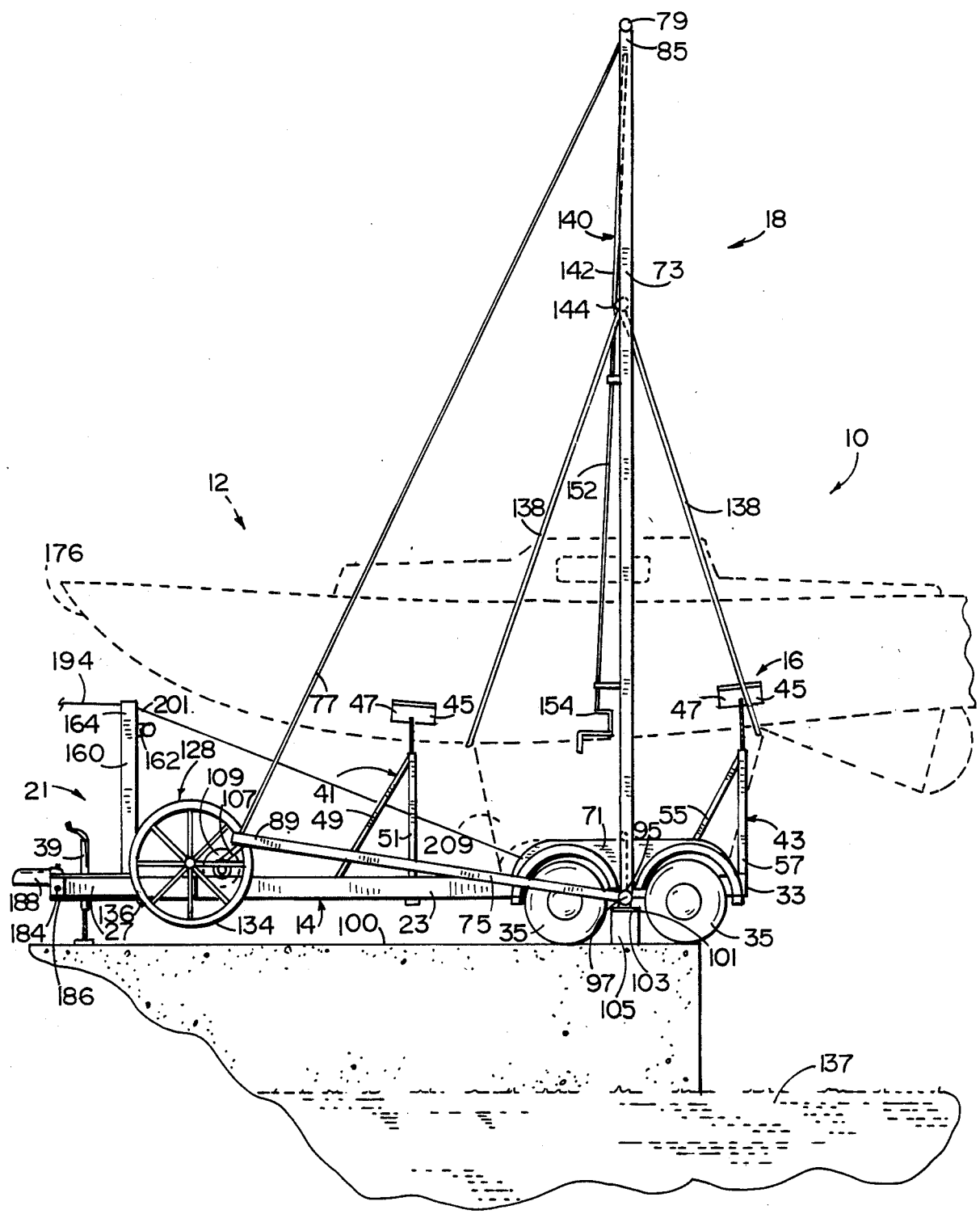
FIG. 3 is a side elevational view of the boat loaded onto the trailer of the present invention.
Figure 6:
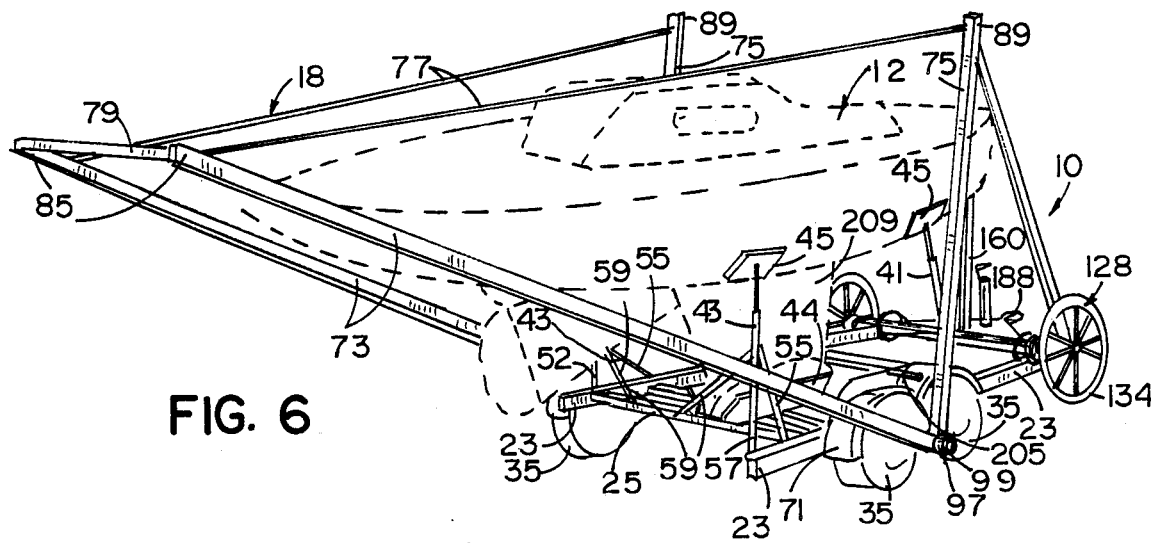
FIG. 6 is a rear perspective view of the trailer.

In the preferred embodiment, a trailer 10 which facilitates a versatile and efficient loading and launching of a fixed keel boat 12 includes a frame 14 having a plurality of boat support structures 16, a pivotal boom 18 and a winch assembly 21 (FIGS. 1-3). These components cooperatingly interact to store, transport, launch and load a fixed keel boat 12.

Frame 14 is of a basic construction having a pair of spaced apart longitudinal main rails 23 interconnected by a plurality of lateral cross members 25 (FIG. 2). At the front end 27 main rails 23 narrow to a point 29 to facilitate coupling of trailer 10 to a vehicle 31. Near the rear end 33 are provided a plurality of wheels 35 mounted upon a pair of spaced apart tandem axles 37. Also, as is conventional with most trailers, front end 27 is further provided with a conventional tongue jack 39.

Figure 7:
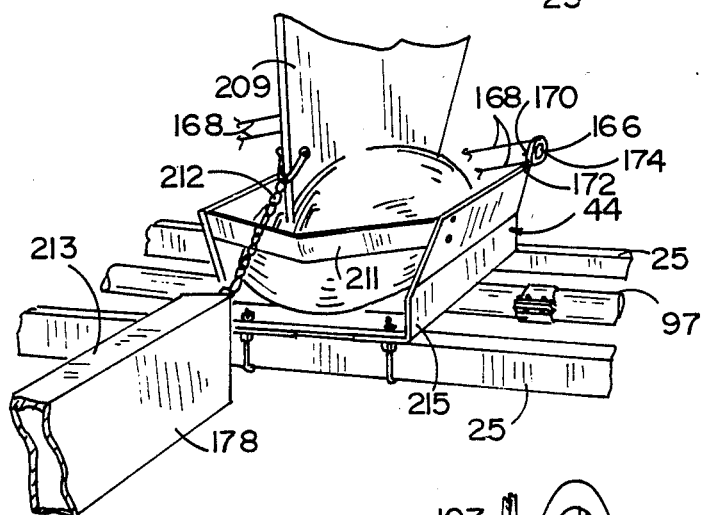
FIG. 7 is an enlarged perspective view of a fixed keel support on the trailer.

Boat support structures 16 include a pair of laterally spaced apart forward, fixed stanchions 41, a pair of laterally spaced apart rear folding stanchions 43 (FIGS. 1-3), and a keel support tray 44 secured to a pair of cross members 25 (FIGS. 2 and 7). Stanchions 41, 43 each support a bunk 45 mounted for vertical adjustment through conventional screw threaded means 47. Each of the stanchions 41, 43 have a tripod configuration. In a forward fixed stanchion 41, a pair of legs 49, 51 are fixedly secured to a main rail 23 and a third leg 53 is fixedly secured to a cross member 25. In a rear folding stanchion 43, the legs 55, 57, 59 have the same assembled configuration as do front fixed stanchions 41, however, rear stanchions 43 are adapted to be folded outwardly and clear the central area for launching and loading of boat 12.

More specifically, legs 55, 57 are fixedly secured together at their upper ends 61, 63 and are pivotally secured to main rails 23 with their lower ends 65, 67 in a substantially inverted L-shaped configuration (FIGS. 1-3). To facilitate the pivoting action, main rails 23 are provided with spaced apart coupling flanges 69 having holes aligned with holes in lower ends 65, 67 of legs 55, 57 to receive a pivot pin (not shown) therethrough (FIGS. 1 and 2). The pivot pin defines an axis substantially parallel to main rails 23 so that legs 55, 57 collectively swing outwardly thereabout. In an assembled and supporting position, a third leg 59 is pivotally coupled to a cross member 25 and the upper portion 63 of leg 57. To adapt the trailer 10 for launching or loading of boat 12, leg 59 is detached from legs 55, 57 and swung inwardly so that it lies along cross member 25. Similarly, legs 55, 57 are swung outwardly to lie against fender assembly 71. The positioning afforded by fender assemblies 71 orients rear stanchions 43 away from the swinging action of boat 12 during launching or loading and yet still inwardly of boom 18 so as to avoid blocking its movement. Of course, trailer 10 could be extended rearwardly such that rear stanchions 43 folded entirely to the ground to thereby also avoid blockage of boom 18.

Boom 18 is a pivotally mounted structure having a pair of main boom members 73, a pair of boom struts 75, a pair of boom tension members 77 and a boom cross member 79 (FIGS. 1 and 2). More particularly, each main boom member 73 is formed as a single weldment with a corresponding boom strut 75 such that their lower ends 81, 83 are interconnected to form a substantially L-shaped configuration (FIGS. 1 and 3). Main boom members 73 and boom struts 75 are preferably oriented at right angles to one another, although other orientations could be utilized. The distal end 85 of each main boom member 73 is fixedly secured to boom cross member 79 such that the spaced apart weldments formed by main boom members and boom struts 73, 75 are oriented substantially parallel to one another. To increase the rigidity of boom 18, a pair of diagonal boom stiffeners 87 are provided between each main boom member 73 and boom cross member 79 (FIG. 2). Also, to further increase the strength of boom 18, boom tension member 77 is attached to the distal ends 85, 89 of main boom member 73 and boom strut 75, respectively, of each L-shaped boom weldment (FIGS. 1 and 3).

At the apexes 91 of the interconnections between each main boom member 73 and boom strut 75 is a fixedly secured sleeve 93 having a bore 95 adapted to receive a lateral pivot rod 97 (FIGS. 1 and 3). Sleeve 93 is releasably mounted upon pivot rod 97 in any conventional fashion, such as being formed as a pair of mating halves joined together about rod 97 during use. Pivot rod 97 is fixedly secured against movement to main rails 23 of frame 14. As best seen in FIG. 2, main boom members 73 and boom struts 75 are mounted outwardly of main rails 23 and fender assemblies 71 so as to permit clearance of the width of the boat.

To help transfer the weight carried by boom 18 directly to the dock, pier, retaining wall, or other supporting surface 100 upon which trailer 10 is supported, each end 99 of pivot rod 97 includes a generally planar foot member 101 (FIGS. 1 and 3). Foot members 101 are fixedly secured to the underside of pivot rod 97 to define a downwardly directed engagement pad 103 adapted to engage a block 105 passed therebeneath. While the boom 18 may be operated without the use of block 105, its use is preferred to decrease the stresses experienced in frame 14 of trailer 10.

Figure 8:
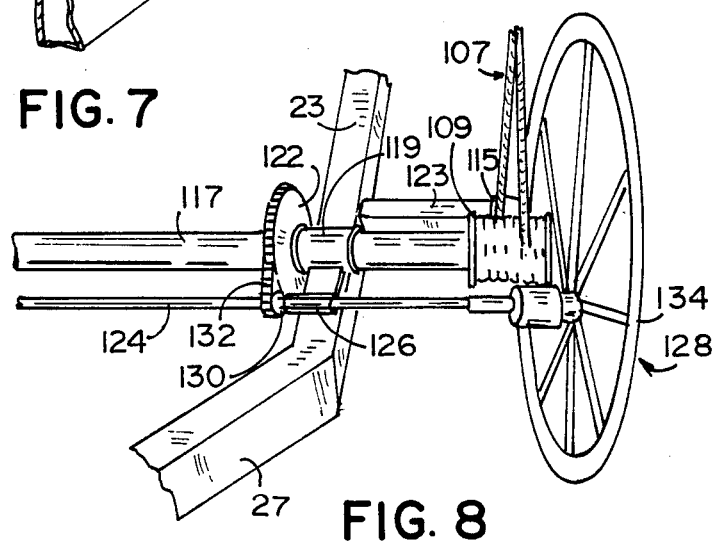
FIG. 8 is a perspective view of the main winch assembly of the trailer.

The pivoting of boom 18 about pivot rod 97 in the launching and loading of boat 12 is preferably accomplished by winch assembly 21 (FIGS. 1, 2 and 8). Winch assembly 21 includes a pair of cable lengths 107, wherein each cable length 107 includes a first end attached to a rotatable drum 109 about which the cable 107 is adapted to wrap and a second end 111 attached to the distal end 89 of the corresponding boom strut 75. As seen in FIG. 1, the intermediate portions of cable 107 are preferably wrapped about a boom sheave 113 and a frame sheave 115 for an additional mechanical advantage.

The rotatable drums 109 are each fixedly secured to opposite ends of a rotating mounting beam 117 (FIGS. 1, 2 and 8). Mounting beam 117 is secured to main rails 23 through the use of bearing elements 119 (FIG. 8). Further, fixedly attached to mounting beam 117 are a pair of enlarged sprockets 122 utilized to drive the rotating drums 109, as will be discussed below. To substantially eliminate the application of lateral forces upon boom struts 75, drums 109 and frame sheaves 115 are mounted in substantial alignment with boom struts 75 (FIG. 2). This orientation is achieved by providing lateral anchorages 123 for mounting frame sheaves 115 and extending mounting beam 117 sufficiently laterally.

More specifically, parallel to mounting beam 117 is provided a drive shaft 124 also mounted for rotation to frame 14 through similar bearing elements 126 (FIG. 8). At each of the opposite ends of drive shaft 124 is provided an enlarged hand wheel 128 which is adapted for manual rotation. Fixedly attached to drive shaft 124 adjacent to each sprocket 122 is a pinion sprocket 130 operably coupled thereto by an endless chain 132. Pinion sprocket 130 is of a substantially smaller diameter than sprocket 122 to thereby increase the mechanical advantage for the user.

In operation, then, of the winch assembly 21, a user manually grasps the peripheral rim 134 of hand wheel 128 and rotates the wheel in either a clockwise or counterclockwise rotation depending on whether he is launching or loading boat 12, respectively (FIGS. 1 and 8). Rotation of hand wheel 128 imparts rotation to drive shaft 124 which through pinion sprocket 130, chain 132 and sprocket 122 rotatingly drives mounting beam 117 (FIG. 8). This, in turn, rotates the fixedly mounted drums 109 for coiling or uncoiling cable 107 therefrom.

Due to the great weight being shifted in the launching or loading of a fixed keel boat 12, a conventional brake means 136 (FIGS. 1 and 3) is provided to selectively engage the peripheral rim 134 of hand wheel 128. More specifically, in the loading of boat 12 onto trailer 10, brake means 136 is constructed to permit rotation of hand wheel 128 in a counterclockwise direction but to resist rotation in the clockwise direction as a safety measure to prevent the user from slipping and permitting the boat 12 to crash back into the water surface 137. Also, when the boat 12 is being launched, brake means 136 may be used to apply a controlled resistance force so that the boat 12 may be lowered in a smooth and uniform fashion by the user, to again avoid a reckless drop of the boat 12 into the water surface. These features may also be encompassed within conventional clutch means provided in the rotatable drums 109. Also, alternatively, drums 109 may be driven by an electric motor (not shown) or the like.

Boat 12 is hoisted by boom 18 through the use of a conventional sling 138 (FIG. 1) commonly used for such boats in connection with a typical fixedly mounted hoist of the prior art. The sling 138 attaches to the distal end 85 of main boom member 73 through a tackle arrangement 140 consisting of a cable 142 and snatch block 144 (FIG. 1). Also mounted at the distal end 85 of each main boom member 73 is a boom tip winch 146 adapted to wind or unwind cable 142 therefrom for the lifting or lowering of boat 12.

Each boom tip winch 146 includes a rotatable drum about which cable 142 is adapted to wrap. Drums 148 are driven by elongated driving rods 152 having convoluted crank handles 154 at their lower ends for manual rotation and worm gears (not shown) at their upper ends to cooperatingly rotate drums 148. Alternatively, an electric motor may be used to drive boom tip winch 146. Alternatively, to coordinate the movement of both boom tip winches 146 so that an even lifting or lowering motion may be imparted to boat 12 without any keeling, a coordinating shaft 156 passes along side boom cross member 79 to interconnect the two boom tip winches 146 (FIG. 2). For extra strength, a pair of bearing braces 158 may secure shaft 156 to cross member 79.

To launch boat 12, trailer 10 is backed up close to the surface of the water (FIG. 3). Once in this position, blocks 105 are positioned beneath foot members 101 in order to transfer the subsequent load of boat 12 directly to the support surface 100. At this point, hand wheel 128 is rotated counterclockwise to erect main boom member 73 in a substantially vertical orientation (FIG. 3). Sling 138 is, then, wrapped about the hull of boat 12 and attached to tackle arrangements 140.

Once boat 12 is prepared for launching, the user first lifts boat 12 off of bunks 45 through the rotation of crank handle 154 which in turn rotates boom tip winches 146 (FIGS. 1 and 3). After boat 12 has cleared bunks 45, rear stanchions 43 are folded outwardly in the manner as discussed above, to provide a large enough passage for the width of boat 12. At this point, the user rotates hand wheel 128 in a clockwise direction in a slow, controlled and uniform manner to gradually pivot boom 18 about pivot rod 97. As boom 18 is pivoted in a clockwise direction (as seen in FIGS. 1 and 3), boat 12 is swung in an arcuate path outwardly and downwardly to be placed gently upon the water surface (FIG. 1). During the swinging motion, it may be desired to manually guide boat 12 from rotating and bumping a portion of boom 18.

The loading of boat 12 onto trailer 10 is performed in the direct reverse manner as described above for the launching.

To facilitate the above described launching operation, pivot rod 97 is located forwardly of the center of gravity of boat 12. This structural arrangement, then, tends to swing boom 18 and boat 12 rearwardly toward the surface of the water, rather than tending to swing the boat forwardly toward vehicle 31. Preferably, pivot rod 97 is positioned between axles 37 at a location very near to the center of gravity of the mounted boat 12. While pivot rod 97 may be positioned forwardly of this location, any reorientation in this direction will require a longer main boom member 73 and a greater moment to be offset in the launching and loading processes.

Also, to prevent boom 18 from falling forwardly past its vertical position, boom strut 75 is provided with such a length so as to abut anchorages 123 mounting frame sheave 115 (FIGS. 1-3). Of course, other stops could be utilized if desired.

The above described launching procedures work very well when the trailer is supported on a surface which either slopes downwardly toward the water surface or is level. In a situation in which the ground slopes away from the water surface, such as due to settling of the ground behind a retaining wall, the center of the gravity of the boat may shift upon lifting of boat 12 from bunks 45, such that boat 12 tends to swing forwardly toward vehicle 31 rather than rearwardly toward the water surface. This situation, then, requires an additional launching step since unwinding of the cable will not, in these instances, swing the main boom member 73 out over the water surface. Instead, when the center of gravity of the boat 12 is forward of pivot rod 97, clockwise rotation of hand wheel 12 will merely play out a slack cable, since there is no driving force to push main boom member 73 rearwardly.

To compensate for this lack of driving force in these situations, a vertical post 160 having an auxiliary hand winch 162 (FIGS. 1-3) mounted to its upper end 164 is provided near the front end of frame 14. The auxiliary winch 162 is adapted to cooperate with a pair of auxiliary sheaves 166 and auxiliary cable 168 (FIG. 7). Auxiliary sheaves 166 are adapted to be secured to a pair of upstanding tabs 170 fixed to the upper rearward corners 172 of keel support tray 44 by bolts 174 or other fastening means. Auxiliary cable 168 is attached at one end to auxiliary winch 162, is fed around one auxiliary sheave 166, looped up around the forward end 176 of boat 12, back through the opposed auxiliary sheave 166 on the opposite end of keel support tray 44 and then back for attachment to vertical post 160. As is readily apparent, upon winding auxiliary cable 168 onto auxiliary winch 162, the loop formed in the cable around forward end 176 of boat 12 begins to shrink and thereby push boat 12 rearwardly toward the water surface. In this manner, a driving force can be easily provided to initiate the swinging of boat 12 outwardly. Once the center of gravity of the boat is once again rearwardly of pivot rod 97, the natural force of gravity on boat 12 will once again take over and tend to swing the boat rearwardly over the water surface.

The moment force created during the launching and loading of the boat requires a significant counter weight. Preferably, the counter weight is provided by tow vehicle 31 (FIG. 4). However, in the launching or loading of most fixed keel boats the counter weight provided at the rear bumper of the vehicle would be insufficient. Hence, trailer 10 is provided with an extensible tongue 178 for increasing the available leverage and therefore increasing the available counter force. More specifically, tongue 178 is slidably received through a channel 180 defined in the front end 27 of frame 14. Tongue 178 further includes a plurality of spaced apart bores 182 which cooperate with an indexing pin 184 received through indexing flange 186 of frame 14. In this way, the amount of extension of tongue 187 can be adjusted depending upon the size of the boat being launched or loaded. The opposite end of tongue 187 includes a heavy-duty coupler 188 adapted to attach to the ball (not shown) on vehicle 31.

To further increase the amount of available counter force provided by vehicle 31, a counterweight assembly 190 is provided (FIG. 4). Assembly 190 includes a conventional "come-a-long" 192 which interfaces between trailer 10 and vehicle 31. More particularly, a dead eye 193 is mounted approximately in the center of vehicle 31 for securing one end of "come-a-long" 192. The opposite end thereof attaches to a cable 194 which is received over a stand 196 in the bed 198 of vehicle 31 and attaches to the upper end 164 of vertical post 160. A moderate load, then, on the "come-a-long" 192 produces a moment at the vehicle/trailer interface. The moment tends to lift the front of the vehicle 31 and supply additional load at the rear to increase the amount of available counter force. To ensure that post 160 is not deformed or broken during the loading of "come-a-long" 192, a pair of tension cables 201 are attached to the upper portion 164 of post 160 and an intermediate cross member 25 of trailer 10.

In transporting trailer 10 on a highway boom 18 due to the size of main boom member 73 must be disconnected from pivot rod 97 (FIG. 5), such as by separating the sleeve halves as discussed above. In this arrangement, main boom members 73 are positioned longitudinally along trailer 10 and in a substantially parallel relationship with main rails 23. More specifically, the lower ends 81 of main boom members 73 are rested upon saddle structures 203 (only shown in FIG. 5) and medial portions of main boom members 73 rest upon extensible boom travel supports 205 attached to the upper surfaces of fender assemblies 71. If desired to avoid any interference during the operation of boom 18, saddle structures 203 may be releasably mounted to main rail 23 by a bolt or other fastening means. Alternatively, saddle structures 203 may be adapted for pivotal movement to enable them to align with main rails 23. Boom travel supports 205 are preferably telescoping members which may be retracted to avoid interference with the operation of main boom members 73 in the loading or launching of a boat, but which also may be extended to provide adequate support when boom 18 is placed in its travel position (FIG. 5). Chains, cables, or other securing members (not shown) may be used to adequately secure boom 18 in this position. Also, boom cross member 79 will act as a rear light bumper to which travel lights may be attached (FIG. 5).

Also during transport, keel 209 is received within the keel support tray 44 such that it abuts a retaining strap 211 which prevents any forward motion of the keel (FIG. 7). To prevent any rearward motion of keel 209, and yet still provide an open passage in the keel support tray 44 for the launching and loading of the boat 12, keel 209 is attached by chain 212 to the rear end 213 of tongue 178. More particularly, during travel, the tongue 178 is indexed in its rearwardmost position such that it rests upon a number of cross members 25 and so that its rear end 213 is proximate to the front end 215 of keel support tray 44.

Of course, it is understood that the above descriptions are those of preferred embodiments of the invention. Various other embodiments, as well as many changes and alterations, may be made without departing from the spirit and broader aspects of the invention as defined in the claims.

The embodiments of the invention in which an exclusive property or privilege is claimed are defined as follows:

1. A trailer for loading, unloading and transporting a fixed keel boat comprising:
   a frame having support means for supporting a fixed keel boat, said support means including a keel support tray, wheels mounted on said frame for permitting transport of the boat supported on said frame, and means for coupling said frame to a vehicle;
   a boom including a pair of arm structures, each structure pivotally coupled to a side of the frame and means for coupling the boat to said arm structures, said arm structures each including a main boom member;
   pivot means on said frame and defining a pivot for pivoting said arm structure to said frame and for permitting said boom to be moved from said pivot for transport; and
   winch means connected to said boom for pivoting said boom about said pivot means during the loading and unloading of the boat.

2. The trailer of claim 1 in which said arm structures each include a boom strut joined to said main boom member and defining an apex therewith, said arm structures being generally L-shaped and wherein said winch means for pivoting said boom includes a winch assembly having at least one rotatable drum, a flaccid element attached to said boom strut and said drum, and drive means for rotating said drum to wind or unwind said flaccid element from said drum, whereby the boat may be loaded or launched from the trailer.

3. The trailer of claim 2 in which said winch means for pivoting said boom includes a pair of rotatable drums wherein each one is positioned in substantial alignment with one said arm structures, and a pair of flaccid elements operably interconnecting the aligned drums and said boom struts of said arm structures, whereby efficient loading and unloading is achieved without any significant lateral stresses being applied to the arm structures through the operation of said flaccid elements. any significant lateral stresses being applied to the arm structures through the operation of said flaccid elements.

4. The trailer of claim 3 in which said winch assembly further includes a mounting beam fixedly mounting said two drums, and wherein said drive means includes at least one hand wheel adapted for manual rotation, a drive shaft fixedly secured thereto and extending in a substantially parallel relation to said mounting beam, and means interconnecting said mounting beam and said drive shaft such that rotation of said drive shaft results in rotation of said mounting beam.

5. The trailer of claim 2 wherein said pivot means includes a pivot element and wherein said pivot element is positioned relative to said means for supporting the fixed keel boat such that the pivot element is positioned forwardly of the center of gravity of the boat so that the boat tends to swing said boom rearwardly during the launching process.

6. The trailer of claim 5 further including an auxiliary winch assembly having an auxiliary rotatable drum, an auxiliary flaccid element, a plurality of sheaves, and means for rotating said drum, all cooperatively arranged such that rotation of said drum in one direction forces said auxiliary flaccid element to push the fixed keel boat rearwardly when such force is needed.

7. The trailer of claim 5 in which said means for coupling the boat to said arm structures includes a tackle arrangement attaching a sling supporting the boat to an outer end of said boom, and means for adjusting the length of said tackle to raise or lower the boat with respect to said end of said boom, whereby the boat may be lifted or lowered onto said supporting means during the launching or loading of the boat.

8. The trailer of claim 7 in which said means for adjusting the length of said tackle includes a rotatable boom tip winch driven by a manual hand crank attached to said boom tip winch by an elongated shaft running longitudinally along a portion of at least one of said arm structures.

9. The trailer of claim 7 in which said boom further includes a tension member interconnecting an outer end of each said boom strut with an outer end of said corresponding main boom member such that each boom structure has a substantially triangular configuration.

10. The trailer of claim 9 in which said outer ends of said main boom members are interconnected by a boom cross member.

11. The trailer of claim 7 in which said outer ends of said main boom members are interconnected by a boom cross member.

12. The trailer of claim 2 in which said means for coupling the boat to said arm structures includes a tackle arrangement attaching a sling supporting the boat to an outer end of said boom, and means for adjusting the length of said tackle to raise or lower the boat with respect to said end of said boom, whereby the boat may be lifted or lowered onto said supporting means during the launching or loading of the boat.

13. The trailer of claim 12 in which said means for adjusting the length of said tackle includes a rotatable boom tip winch driven by a manual hand crank attached to said boom tip winch by an elongated shaft running longitudinally along a portion of at least one of said arm structures.

14. The trailer of claim 13 further including travel support means which support said boom during transport in a position in which said main boom member extends longitudinally along said frame in a substantially horizontal orientation and said boom strut is positioned substantially forwardly of said pivot means in an upstanding relationship.

15. The trailer of claim 1 in which said means for supporting the boat includes a pair of spaced apart forward support structures and a pair of spaced apart rearward support structures, wherein said rearward support structures are movably mounted to said frame for movement between a first position for supporting the boat and a second position which enlarges the passage through which the boat is passed during the launching and loading processes.

16. The trailer of claim 1 in which said means for coupling said frame to a vehicle includes an extensible tongue which may be extended from said frame to thereby increase the ability of the vehicle to act as an effective counterweight for said trailer.

17. The trailer of claim 16 further including a counterweight assembly having an upstanding post mounted to said frame, a tensioning means attached to said vehicle and a flaccid means for interconnecting said tensioning means and said upstanding post, whereby said tensioning means applies a tension through said flaccid means to further increase the ability of the vehicle to act as a counterweight.

18. The trailer of claim 1 further including a counterweight assembly having an upstanding post mounted to said frame, a tensioning means attached to said vehicle and a flaccid means for interconnecting said tensioning means and said upstanding post, whereby said tensioning means applies a tension through said flaccid means to further increase the ability of the vehicle to act as a counterweight.

19. The trailer of claim 1 wherein said pivot means further includes a pair of ends and a foot member mounted to each end, each said foot member being adapted to cooperate with a block element to thereby transfer the load in said boom directly to a supporting surface supporting aid trailer, whereby stress in said frame is decreased.

20. A self-loading and unloading boat trailer comprising:
a frame having means for supporting a boat, wheels mounted to said frame for permitting transport of the boat supported on said frame, and means for coupling said frame to a vehicle;
a boom pivotally mounted to said frame and including a pair of substantially L-shaped arm structures each including a main boom member having means for supporting the boat and a boom strut, said main boom member and said boom strut defining an apex;
pivot means on said frame and defining a pivot for pivotally mounting said arm structures at said apex to said frame and for permitting the boom to be moved from said pivot for transport; and
means coupled to said boom struts for pivoting said arm structures to move the boat during the loading and unloading of the boat. boat.

21. The trailer of claim 20 in which said means for pivoting said arm structures includes a winch assembly having a pair of rotatable drums, flaccid means for movably attaching each boom strut to one of said drums, and drive means for rotating said drums to thereby wind or unwind the flaccid means therefrom.

22. The trailer of claim 21 in which said pivot means further includes a pivot element pivotally attaching said boom to said frame, said pivot element positioned relative to said means for supporting said article such that said pivot element is positioned forwardly of the center of gravity of the boat so that the boat tends to swing the boom rearwardly during the unloading process 23. The trailer of claim 22 in which said means for supporting the boat includes a tackle arrangement attaching a sling supporting the boat to an outer end of said main boom member, and means for adjusting the length of said tackle to raise or lower the boat with respect to said end of said main boom member.

24. The trailer of claim 23 in which said means for supporting the boat includes a pair of spaced apart forward support structures and a pair of spaced apart rearward support structures, wherein said rearward support structures are movably mounted for movement between a first position supporting the boat and a second position which enlarges the passage through which the boat is passed during loading and 25. The trailer of claim 24 in which said means for coupling said frame to a vehicle includes an extensible tongue which may be extended from said trailer to thereby increase the ability of the vehicle to act as a counterweight.

26. The trailer of claim 25 further including a counterweight assembly having a post mounted to said frame, a tensioning means attached to the vehicle, and a counterweight flaccid means for interconnecting said tensioning means and said upstanding post, whereby said tensioning means supplies a tension through said counterweight flaccid means to further increase the ability of the vehicle to act as a counterweight.

27. The trailer of claim 26 wherein said pivot element further includes a pair of ends and a foot member mounted on each end, each said foot member being adapted to cooperate with a block element to thereby transfer the load created in said boom directly to a supporting surface supporting said trailer, whereby stress in said frame is decreased.

28. The trailer of claim 27 in which said boom further includes a cross member interconnecting said outer ends of said main boom members.

29. The trailer of claim 28 in which said boom further includes a tension member interconnecting an outer end of each said boom strut with said outer end of a corresponding main boom member to thereby form a pair of substantially triangular configured structure to each side of the boat.

* * * * *

UNITED STATES PATENT AND TRADEMARK OFFICE
CERTIFICATE OF CORRECTION

PATENT NO. : 4,889,465                                   PAGE 1 OF 2
DATED      : December 26, 1989
INVENTOR(S): Richard E. Brooks It is certified that error appears in the above-identified patent and that said Letters Patent is hereby corrected as shown below:

Column 7, Lines 66-68

After "elements." delete --any significant lateral stresses being applied to the arm structures through the operation of said flaccid elements.--

Column 8, Line 20:

"cooperatively" should be --cooperatingly--

Column 9, Claim 19, Line 41:

"aid" should be --said--

Column 10, Claim 20, Line 3:

After "boat." delete --boat.--

Column 10, Claim 22, Line 16:

After "process" insert --.--

UNITED STATES PATENT AND TRADEMARK OFFICE
CERTIFICATE OF CORRECTION

PATENT NO. : 4,889,465

DATED : December 26, 1989

INVENTOR(S) : Richard E. Brooks

It is certified that error appears in the above-identified patent and that said Letters Patent is hereby corrected as shown below:

Column 10, Claim 24, Line 30:

After "and" insert --unloading thereof.--

Column 10, Claim 29, Line 58:

"structure" should be --structures--

Signed and Sealed this

Tenth Day of September, 1991

Attest:

HARRY F. MANBECK, JR.

*Attesting Officer*    *Commissioner of Patents and Trademarks*